(12) United States Patent
Meier et al.

(10) Patent No.: US 8,646,692 B2
(45) Date of Patent: *Feb. 11, 2014

(54) DEVICES AND METHODS EMPLOYING DUAL TARGET AUTO EXPOSURE

(75) Inventors: Timothy P. Meier, Camillus, NY (US); Stephen P. Deloge, Palmyra, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/250,282

(22) Filed: Sep. 30, 2011

(65) Prior Publication Data

US 2013/0082109 A1    Apr. 4, 2013

(51) Int. Cl.
*G06K 7/10* (2006.01)
*G06K 15/12* (2006.01)
*G08C 21/00* (2006.01)

(52) U.S. Cl.
USPC ............ 235/462.41; 235/462.06; 235/462.11; 235/462.42

(58) Field of Classification Search
USPC .............. 235/462.41, 462.06, 462.11, 462.42
See application file for complete search history.

(56) References Cited

U.S. PATENT DOCUMENTS

| | | | |
|---|---|---|---|
| 5,019,699 A | 5/1991 | Koenck | |
| 5,406,062 A | 4/1995 | Hasegawa et al. | |
| 5,504,367 A | 4/1996 | Arackellian et al. | |
| 5,541,419 A | 7/1996 | Aracellian | |
| 5,572,006 A | 11/1996 | Wang et al. | |
| 5,576,529 A | 11/1996 | Koenck et al. | |
| 5,591,955 A | 1/1997 | Laser | |
| 5,646,390 A | 7/1997 | Wang et al. | |
| 5,648,650 A | 7/1997 | Sugifune et al. | |
| 5,701,001 A | 12/1997 | Sugifune et al. | |
| 5,756,981 A | 5/1998 | Roustaei et al. | |
| 5,784,102 A | 7/1998 | Hussey et al. | |
| 5,815,200 A | 9/1998 | Ju et al. | |
| 5,877,487 A | 3/1999 | Tani et al. | |
| 5,886,338 A | 3/1999 | Arackellian et al. | |
| 6,010,070 A | 1/2000 | Mizuochi et al. | |
| 6,230,975 B1 | 5/2001 | Colley et al. | |
| 6,254,003 B1 | 7/2001 | Pettinelli et al. | |
| 6,283,374 B1 | 9/2001 | Fantone et al. | |
| 6,347,163 B2 | 2/2002 | Roustaei | |
| 6,412,700 B1 | 7/2002 | Blake et al. | |
| 6,669,093 B1 | 12/2003 | Meyerson et al. | |

(Continued)

OTHER PUBLICATIONS

Van Volkinburg et al., Pending U.S. Appl. No. 12/957,971, filed Dec. 1, 2010, entitled "Terminal With Screen Reading Mode".

(Continued)

*Primary Examiner* — Thien T Mai
*Assistant Examiner* — Toan Ly
(74) *Attorney, Agent, or Firm* — Addition, Higgins, Pendleton & Ashe, P.A.

(57) ABSTRACT

The method includes automatically adjusting a first control parameter in a device for capturing a first plurality of images, automatically adjusting a second control parameter in the device for capturing a second plurality of images such that automatic adjustment of the first control parameter is interspersed with, separate from, and obtained generally concurrently with the automatic adjustment of the second control parameter. The adjustment of the first control parameter being determined differently compared to adjustment of the second control parameter. The method may include attempting to decode a decodable indicia utilizing one or more images of the first and second plurality of images.

32 Claims, 6 Drawing Sheets

(56) References Cited

U.S. PATENT DOCUMENTS

| | | |
|---|---|---|
| 6,695,209 B1 | 2/2004 | La |
| 6,749,120 B2 * | 6/2004 | Hung et al. ............... 235/472.01 |
| 6,832,725 B2 | 12/2004 | Gardiner et al. |
| 6,877,661 B2 | 4/2005 | Webb et al. |
| 7,061,395 B1 | 6/2006 | Bromer |
| 7,077,321 B2 | 7/2006 | Longacre, Jr. et al. |
| 7,083,097 B2 | 8/2006 | Toyama et al. |
| 7,083,098 B2 | 8/2006 | Joseph et al. |
| 7,148,923 B2 | 12/2006 | Harper et al. |
| 7,175,092 B2 | 2/2007 | Pettinelli, Jr. et al. |
| 7,185,817 B2 | 3/2007 | Zhu et al. |
| 7,219,843 B2 | 5/2007 | Havens et al. |
| 7,234,641 B2 | 6/2007 | Olmstead |
| 7,240,844 B2 | 7/2007 | Zhu et al. |
| 7,255,279 B2 | 8/2007 | Zhu et al. |
| 7,270,274 B2 | 9/2007 | Hennick et al. |
| 7,303,126 B2 | 12/2007 | Patel et al. |
| 7,308,375 B2 | 12/2007 | Jensen et al. |
| 7,320,431 B2 | 1/2008 | Zhu et al. |
| 7,336,197 B2 | 2/2008 | Ding et al. |
| 7,357,326 B2 | 4/2008 | Hattersley et al. |
| 7,387,250 B2 | 6/2008 | Mani |
| 7,398,927 B2 | 7/2008 | Olmstead et al. |
| 7,471,828 B1 | 12/2008 | Meier |
| 7,490,778 B2 | 2/2009 | Zhu et al. |
| 7,503,499 B2 | 3/2009 | Zhu et al. |
| 7,513,430 B2 | 4/2009 | Zhu et al. |
| 7,516,899 B2 | 4/2009 | Laser |
| 7,527,207 B2 | 5/2009 | Acosta et al. |
| 7,533,824 B2 | 5/2009 | Hennick et al. |
| 7,568,628 B2 | 8/2009 | Wang et al. |
| 7,611,060 B2 | 11/2009 | Wang et al. |
| 7,656,556 B2 | 2/2010 | Wang |
| 7,693,744 B2 | 4/2010 | Forbes |
| 7,735,737 B2 | 6/2010 | Kotlarsky et al. |
| 7,762,464 B2 | 7/2010 | Goren et al. |
| 7,770,799 B2 | 8/2010 | Wang |
| 7,775,436 B2 | 8/2010 | Knowles et al. |
| 7,780,089 B2 | 8/2010 | Wang |
| 7,809,407 B2 | 10/2010 | Oshima et al. |
| 7,810,720 B2 | 10/2010 | Lovett |
| 7,813,047 B2 | 10/2010 | Wang et al. |
| 7,852,519 B2 | 12/2010 | Meier et al. |
| 7,874,485 B2 | 1/2011 | Meier et al. |
| 7,909,257 B2 | 3/2011 | Wang et al. |
| 7,918,398 B2 | 4/2011 | Li et al. |
| 7,995,178 B2 | 8/2011 | Suguro et al. |
| 8,074,887 B2 | 12/2011 | Havens et al. |
| 8,387,881 B2 * | 3/2013 | Van Volkinburg et al. ... 235/455 |
| 2003/0062413 A1 | 4/2003 | Gardiner et al. |
| 2003/0222147 A1 | 12/2003 | Havens et al. |
| 2004/0020990 A1 | 2/2004 | Havens et al. |
| 2004/0164165 A1 | 8/2004 | Havens et al. |
| 2005/0001035 A1 | 1/2005 | Hawley et al. |
| 2005/0023356 A1 | 2/2005 | Wiklof et al. |
| 2005/0103854 A1 | 5/2005 | Zhu et al. |
| 2005/0279836 A1 | 12/2005 | Havens et al. |
| 2006/0011724 A1 | 1/2006 | Joseph et al. |
| 2006/0043194 A1 | 3/2006 | Barkan et al. |
| 2006/0113386 A1 | 6/2006 | Olmstead |
| 2006/0163355 A1 | 7/2006 | Olmstead et al. |
| 2006/0202036 A1 | 9/2006 | Wang et al. |
| 2007/0138293 A1 | 6/2007 | Zhu et al. |
| 2007/0181692 A1 | 8/2007 | Barkan et al. |
| 2007/0284447 A1 | 12/2007 | McQueen |
| 2008/0023556 A1 | 1/2008 | Vinogradov et al. |
| 2008/0223933 A1 | 9/2008 | Smith |
| 2009/0001163 A1 * | 1/2009 | Barkan et al. ............... 235/454 |
| 2009/0026267 A1 | 1/2009 | Wang et al. |
| 2009/0057413 A1 | 3/2009 | Vinogradov et al. |
| 2009/0072038 A1 | 3/2009 | Li et al. |
| 2009/0140050 A1 | 6/2009 | Liu et al. |
| 2010/0044436 A1 | 2/2010 | Powell et al. |
| 2010/0044440 A1 | 2/2010 | Wang et al. |
| 2010/0078477 A1 | 4/2010 | Wang et al. |
| 2010/0090007 A1 | 4/2010 | Wang et al. |
| 2010/0108769 A1 | 5/2010 | Wang et al. |
| 2010/0147956 A1 | 6/2010 | Wang et al. |
| 2011/0036910 A1 | 2/2011 | Bremer et al. |
| 2011/0163165 A1 | 7/2011 | Liu et al. |
| 2011/0174880 A1 | 7/2011 | Li et al. |
| 2012/0000982 A1 | 1/2012 | Gao et al. |
| 2012/0111944 A1 | 5/2012 | Gao et al. |
| 2012/0138684 A1 | 6/2012 | Van Volkinburg et al. |
| 2012/0153022 A1 | 6/2012 | Havens et al. |
| 2012/0193429 A1 | 8/2012 | Van Volkinburg et al. |

OTHER PUBLICATIONS

Van Volkinburg et al., Pending U.S. Appl. No. 13/017,926, filed Jan. 31, 2011, entitled "Terminal With Flicker-Corrected Aimer and Alternating Illumination".

Jovanouski et al., Pending U.S. Appl. No. 12/981,793, filed Dec. 30, 2010, entitled "Terminal Having Illumination and Exposure Control".

MS7580 Genesis TM Presentation Area Imager Installation and User's Guide, available from Metrologic Instruments, Inc. Blackwood, NJ, printout available online on Oct. 3, 2011, at http://www.kalischgmbh.de/doku/ms7580guide.pdf, 48-pages, 2008.

U.S. Appl. No. 13/174,333, filed Jun. 30, 2011.
U.S. Appl. No. 13/309,195, filed Dec. 1, 2011.
U.S. Appl. No. 13/170,104, filed Jun. 27, 2011.
U.S. Appl. No. 13/324,197, filed Dec. 13, 2011.
U.S. Appl. No. 13/428,500, filed Mar. 23, 2012.

Extended European Search Report in counterpart European Application No. 12185991.2 dated Oct. 16, 2013, pp. 1-4.

Office Action in counterpart European Application No. 12185991.2 dated Dec. 6, 2013, pp. 1-6.

* cited by examiner

DEVICES AND METHODS EMPLOYING DUAL TARGET AUTO EXPOSURE

FIELD OF THE INVENTION

The present invention relates in general to image data collection, and in particular to devices and methods employing dual target auto exposure such as image sensor based indicia reading terminals.

BACKGROUND OF THE INVENTION

Indicia reading terminals for reading decodable indicia are available in multiple varieties. For example, minimally featured indicia reading terminals devoid of a keyboard and display are common in point of sale applications. Indicia reading terminals devoid of a keyboard and display are available in the recognizable gun style form factor having a handle and trigger button (trigger) that can be actuated by an index finger.

Indicia reading terminals having keyboards and displays are also available. Keyboard and display equipped indicia reading terminals are commonly used in shipping and warehouse applications, and are available in form factors incorporating a display and keyboard. In a keyboard and display equipped indicia reading terminal, a trigger button for actuating the output of decoded messages is typically provided in such locations as to either enable actuation by a thumb of an operator or in some cases also providing a handle and trigger button that can be actuated by the index finger.

Indicia reading terminals in a form devoid of a keyboard and display or in a keyboard and display equipped form are commonly used in a variety of data collection applications including point of sale applications, shipping applications, warehousing applications, security check point applications, and patient care applications, and personal use, common where keyboard and display equipped indicia reading terminal is provided by a personal mobile telephone having indicia reading functionality.

Some indicia reading terminals are adapted to read bar code symbols including one or more of one dimensional (1D) bar codes, stacked 1D bar codes, and two dimensional (2D) bar codes. Other indicia reading terminals are adapted to read optical character recognition (OCR) characters while still other indicia reading terminals are equipped to read bar code symbols, OCR characters, postal symbologies or other information bearing indicia.

Bar code symbols are typically disposed on a substrate such as paper. Recently, bar code symbols are now being displayed on a display screen. Attempts have been made to provide indicia reading terminals capable of reading bar codes on paper and bar codes displayed on a display screen. For example, one attempt includes the indicia reading terminals toggling back and forth between frames with and without the illumination on and each having custom fixed exposures.

There is a need for further image data collection, and in particular to devices and methods employing dual target auto exposure such as image sensor based indicia reading terminals.

SUMMARY OF THE INVENTION

In a first aspect, the present invention provides a device for obtaining images which includes an imaging subsystem comprising an image sensor array and an imaging assembly operative for focusing an image onto the image sensor array, and a housing incorporating the imaging subsystem. The device is adapted to acquire a first plurality of images based on a first control parameter in which the first control parameter for a subsequent image of the first plurality of images is adjusted based on a prior image of the first plurality of images, and adapted to acquire a second plurality of images based on a second control parameter in which the second control parameter for a subsequent image of the second plurality of images is adjusted based on a prior image of the second plurality of images. The adjustment of the first control parameter being determined differently compared to adjustment of the second control parameter. The acquisition of the first plurality of images is interspersed with and obtained generally concurrently with acquisition of the second plurality of images, and the acquisition of the first plurality of images and adjustment of the first control parameter being separate from acquisition of the second plurality of images and adjustment of the second control parameter.

In a second aspect, the present invention provides an indicia reading terminal which includes an illumination subsystem operative for projecting an illumination pattern, an imaging subsystem comprising an image sensor array and an imaging assembly operative for focusing an image onto the image sensor array, and a housing incorporating the illumination subsystem and the imaging subsystem. The indicia reading terminal is adapted to acquire a first plurality of images exposed during illuminated portions of the illumination pattern based on a first control parameter in which the first control parameter for a subsequent image of the first plurality of images is adjusted based on a prior image of the first plurality of images, and adapted to acquire a second plurality of images exposed during unilluminated portions of the illumination pattern based on a second control parameter in which the second control parameter for a subsequent image of the second plurality of images is adjusted based on a prior image of the second plurality of images. The acquisition of the first plurality of images being interspersed with and being obtained generally concurrently with acquisition of the second plurality of images, and acquisition of the first plurality of images and adjustment of the first control parameter being separate from acquisition of the second plurality of images and adjustment of the second control parameter. The indicia reading terminal is operable to attempt to decode a decodable indicia comprising a bar code disposed on a substrate in ambient light using at least one of the first plurality of images, and operable to attempt to decode a decodable indicia comprising a bar code disposed on a backlit display using at least one of the second plurality of images.

In a third aspect, the present invention provides a method for use in obtaining images. The method includes automatically adjusting a first control parameter in a device for capturing a first plurality of images, automatically adjusting a second control parameter in the device for capturing a second plurality of images such that automatic adjustment of the first control parameter is interspersed with, separate from, and obtained generally concurrently with the automatic adjustment of the second control parameter. The adjustment of the first control parameter being determined differently compared to adjustment of the second control parameter.

In a fourth aspect, the present invention provides a method for decoding decodable indicia. The method includes projecting an illumination pattern from an indicia reading terminal onto a decodable indicia, automatically adjusting a first control parameter in the indicia reading terminal for capturing a first plurality of images exposed during illuminated portions of the illumination pattern, automatically adjusting second control parameter in the indicia reading terminal for capturing a second plurality of images exposed during unilluminated portions of the illumination pattern such that automatic adjustment of the first control parameter is interspersed with and obtained generally concurrently with the automatic adjustment of the second control parameter, and attempting to decode the decodable indicia utilizing one or more images of the first and second plurality of images.

BRIEF DESCRIPTION OF THE DRAWINGS

The subject matter which is regarded as the invention is particularly pointed out and distinctly claimed in the concluding portion of the specification. The invention, however, may best be understood by reference to the following detailed description of various embodiments and the accompanying drawings in which:

DETAILED DESCRIPTION OF THE INVENTION

Figure 1:
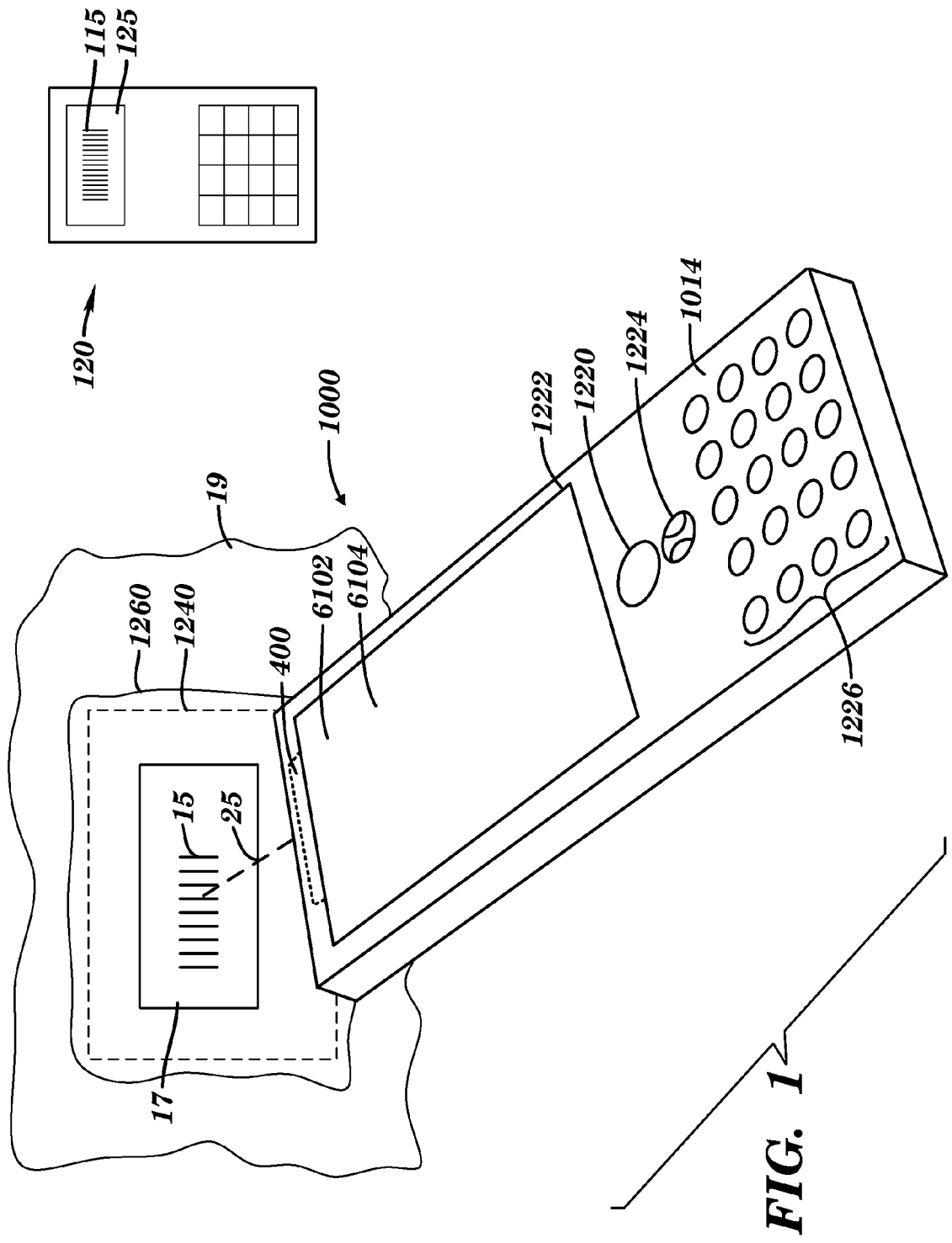
FIG. 1 is a schematic physical form view of one embodiment of an indicia reading terminal in accordance with an aspect of the present invention.

FIG. 1 illustrates one embodiment of an indicia reading terminal 1000 having a dual target autoexposure capability in accordance with an aspect of the present invention. For example, as explained below, the dual target autoexposure may include separate autoexposure capabilities one tailored for reading the decodable indicia such as a bar code 15 disposed on a substrate 17 such as paper e.g., attached to a product 19, or device having an electronic paper display, and the other tailored for reading decodable indicia such as a bar code 115 displayed on an electronic device 120 such as a screen 125 such as a display, monitor, backlit screen, LCD display, or other screen, for example, as a mobile phone, cell phone, satellite phone, smart phone, telemetric device, personal data assistant, and other devices.

As described below, the autoexposure routines may be run generally concurrently at the same time and decoupled from each other. For example, the indicia reading terminal may be used to obtain a series of odd images, where the exposure value of a subsequent odd image is determined with an auto exposure routine optimized for properly capturing images of bar codes printed on paper or other non-backlit environment, and separately obtain a series of even images where the exposure value of a subsequent even image is determined with an auto exposure routine optimized for properly capturing images of bar codes rendered on a backlit display. As used in herein, the term "image" may refer to an image, a portion of an image, image data relating to an image, and a portion of image data relating to an image, and are used interchangeably herein.

By adapting terminal 1000 so that each of the autoexposure capabilities can be made active responsively to an activation of a trigger signal, terminal 1000 may be rendered as better suited for reading of decodable indicia in an expanded range of operating environments. For example, if the decodable image is a bar code on paper or electronic paper, the auto exposure routine used for the series of odd images, may result in capturing images better suited for reading and/or decoding the bar code compared to the series of even images. If the decodable image is a bar code displayed on a display having its own illumination, the auto exposure routine used for the series of even images, may result in capturing images better suited for reading and/or decoding the bar code compared to the series of odd images. By interleaving and alternating between the two auto exposure routines, terminal 1000 may improve or optimize its performance in reading the screen-based indicia and paper-based indicia, where the decoding of indicia in both situations is desired From the present description, it will be appreciated that the present invention addresses the problem associated with conventional indicia reading terminals using fixed exposures or fixed image control parameters in decoding decodable indicia on, for example, cell phones where different cell phones may have different brightness levels and surface reflectivity which make it difficult to decode the indicia. In addition, it will be appreciated that the present invention addresses the problem associated with conventional indicia reading terminals using fixed exposures or fixed image control parameters in decoding decodable indicia on a substrate such as paper, or a product where the substrate and the indicia itself may have different colors and surface reflectivity which make it difficult to decode the indicia.

The following description uses nomenclature associated with indicia reading terminals that may generally include hand held indicia reading terminals or fixed indicia reading terminals optimized for reading printed or displayed indicia, however those of ordinary skill in the art will recognize that the present invention is applicable to a variety of other devices having an imager which may be configured. Examples of such devices are: mobile phones, cell phones, satellite phones, smart phones, telemetric devices, personal data assistants, and other devices which have imaging capability and are capable of adjusting the configuration of the imager.

Figure 2:
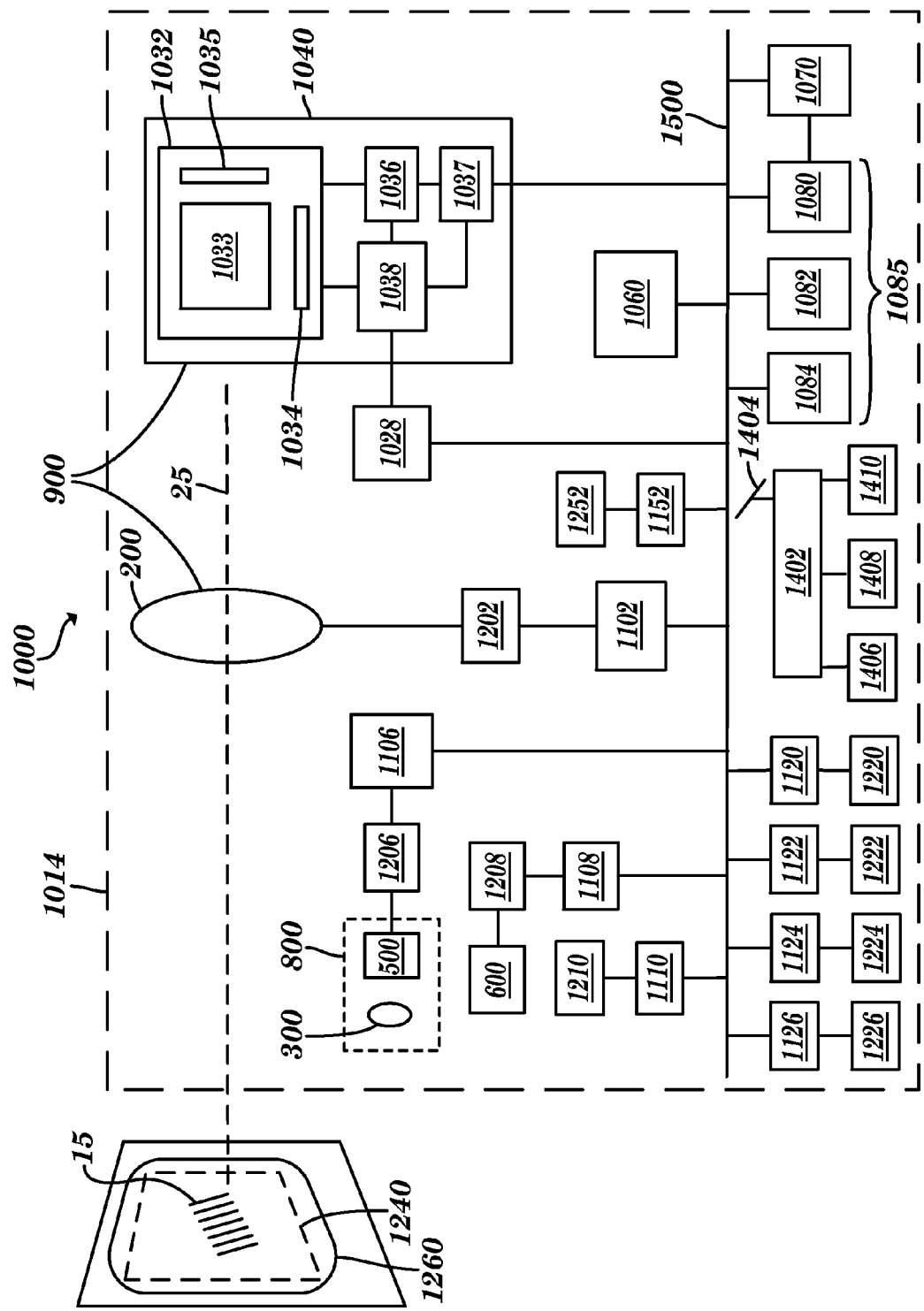
FIG. 2 is a block diagram of the indicia reading terminal of FIG. 1.

FIG. 2 depicts a block diagram of indicia reading terminal 1000, in accordance with an illustrative embodiment that corresponds with indicia reading terminal 1000. Generally, indicia reading terminal 1000 may include an illumination subsystem 800, an imaging subsystem 900, a hand held housing 1014, a memory 1085, and a processor 1060.

Illumination subsystem 800 may be operative for projecting an illumination pattern 1260 (FIGS. 1 and 2). Imaging subsystem 900 may include an image sensor array 1033 and an imaging optics assembly 200 operative for focusing an image onto the image sensor array 1033. Hand held housing 1014 (FIGS. 1 and 2) encapsulates illumination subsystem 800 and imaging subsystem 900, in this illustrative embodiment. Memory 1085 is capable of storing an image, in which the image data may represent light incident on image sensor array 1033. Processor 1060 is operative for addressing memory 1085 and processing the frames of image data, such as processing for attempting to decode decodable indicias represented in the image data.

Figure 3:
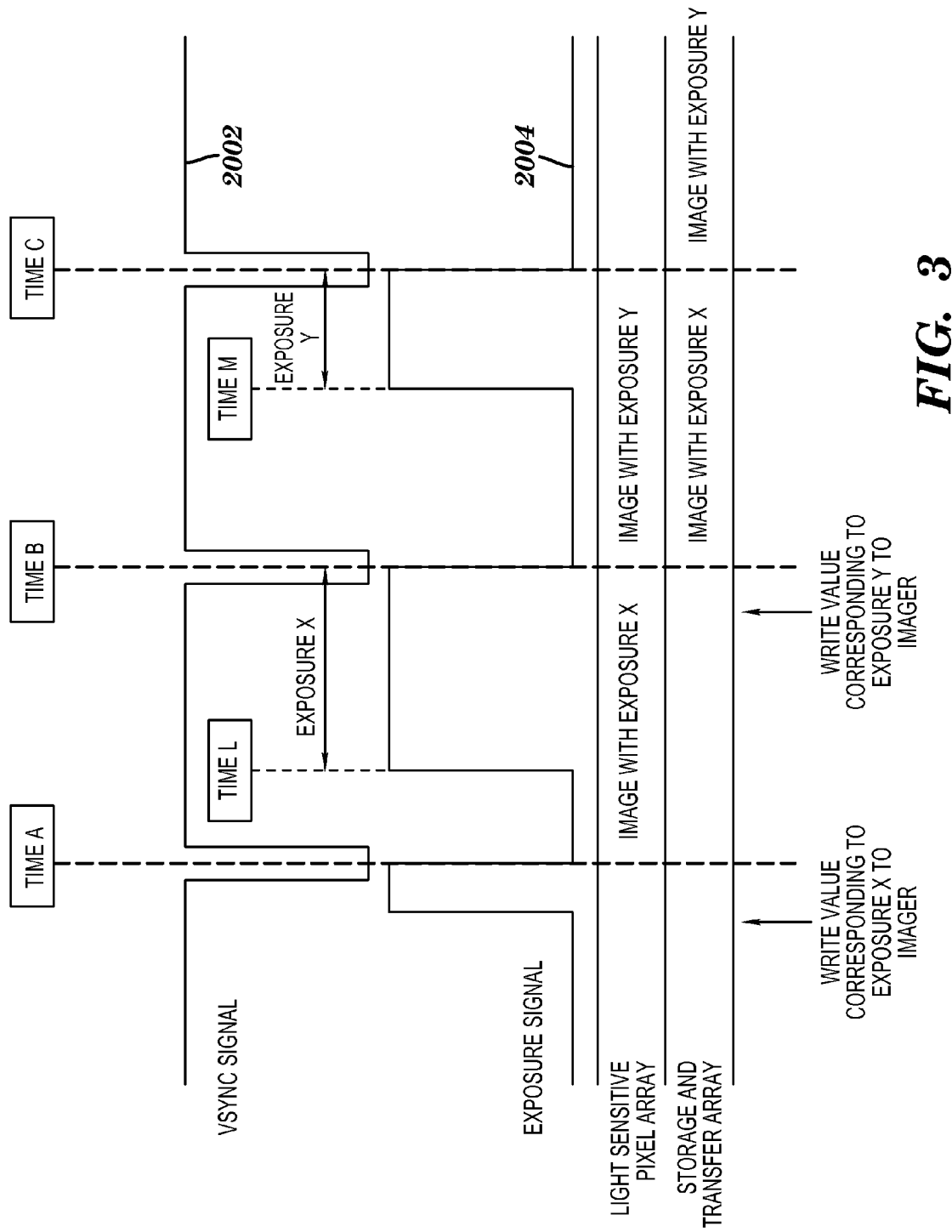
FIG. 3 is diagrammatic illustration of an imager with a full-frame shutter operating in video mode for use in the indicia reading terminal of FIG. 1.

FIG. 3 illustrates a basic operation of an imager utilizing a full-frame shutter in video mode, e.g., a mode where frames are constantly being captured. A vertical synchronization signal (VSYNC) 2002 is a signal generated by an imager which in this example is active high when a frame of image data is being transferred from the device, and transition between successive frames occurs during the active low period of this signal. In this diagram, Times A, B, and C represent the transition times between successive frames. Several events occur on or near this transition time. The first event is that the value of the exposure register is latched into the imager specifying the time duration of the exposure for use on the next frame. Therefore, any time during a frame the exposure can be written, however at this transition time, the exposure value in the register(s) at that time is latched in for use in the imager on the next frame. The second event which occurs on the transition time is that imagers with a full-frame shutter terminate the building of charge on the light sensitive pixels, i.e., the exposure window of the imager closes at this point. This is illustrated in FIG. 3 by the exposure signal 2004 which is active high during the time when the light sensitive array is allowed to accumulate charge. Accumulating charge in the light sensitive pixels determines the illumination levels in the pixels. This accumulating of charge is also referred to as the image being exposed, or exposing the image and are used interchangeably herein. The third event which occurs on the transition time is that the charge built up on the light sensitive array is dumped into a Storage and Transfer array and during the next active high period of the VSYNC signal the pixel data that was put into the Storage and Transfer array will be transferred out of the imager. After the light sensitive array data is dumped into the Storage and Transfer array, the light sensitive array is held at reset to avoid building any charge until the exposure window opens and charge is allowed to be gained again for the next image.

For simplicity, in the example represented in FIG. 3, the events during the transition time are treated as occurring at a single point in time. The actual implementation of an imager may have these events be synchronized at a single point in time, or happen independently across a range of time while the VSYNC signal is inactive. As such, practical usage of an imager typically treats these events as potentially happening at any time while VSYNC is inactive, and treats a frame as being from edge to similar edge of the VSYNC signal. More typically, a frame is treated as being from one active going edge of VSYNC to the next active going edge of VSYNC.

The timeline of events for a single image in FIG. 3 starts with the writing of the register value corresponding to Exposure X to the imager's exposure register(s), which is shown as occurring just prior to Time A. At time A, Exposure X is latched into the imager and will be in effect for the exposing of the light sensitive array during the frame between Time A and Time B. Immediately after Time A, the light sensitive array is held in reset until the exposure window opens so that the light sensitive array can accumulate charge. The time at which the light sensitive array will be allowed to accumulate charge is Time L. The time elapse between Time L and Time B is the exposure time of Exposure X, and is illustrated by the exposure signal 2004 being active high between Time L and Time B. At Time B, the exposure window closes and the light sensitive array data is dumped into the Storage and Transfer array. After Time B, the pixel data which was generated with Exposure X, will be transferred out row by row, and pixel by pixel during the active high period of VSYNC between Time B and Time C. It is noticed that the register value corresponding to Exposure X was written before time A, but the image data generated using Exposure X was only seen being transferred from the imager after Time B. An entire frame goes by between the writing of Exposure X, and seeing the new image data generated with Exposure X. This illustrates the two frame pipeline.

Again, referring to FIG. 3, a feature of the two frame pipeline is that the pipeline can be kept full. It is noticed that the writing of the register value corresponding to Exposure Y to the imager's exposure register(s), occurs just prior to Time B. So, while the imager was exposing the pixel array with Exposure X, Exposure Y was written to the exposure register(s). At Time B, the Exposure Y takes effect in the imager, and while the image with Exposure X is being transferred out of the imager, the light sensitive array is being held in reset, and then is allowed to accumulate charge at Time M. The time elapse between Time M and Time C is the exposure time of Exposure Y, and is illustrated by the exposure signal 2004 being active high between Time M and Time C. At time C, the image data generated with Exposure X has completed its transfer out of the imager, and the image data generated with Exposure Y is dumped into the Storage and Transfer array and after Time C, the image data generated with Exposure Y is transferred out of the imager.

This sequence of writing of exposure values, and obtaining data generated with that exposure value 2 frames later, i.e., the two frame pipeline, can be continued indefinitely as long as the imager is powered and running in a video mode.

By designing an auto exposure routine that evaluates pixel data while it is being transferred out of the imager and then to set an exposure value on the imager before the end of the frame, the auto-exposure routine has a 2 frame turnaround. In other words, the auto exposure system evaluates pixel data as it is coming out of the imager, sets a new exposure value before completion of the pixel data being transferred, and the data with that new exposure value comes out 2 frames later. This means that the specific auto exposure routine would do the process of sampling, and setting new exposure values, every other frame. Therefore, two auto exposure routines which can sample and update every other frame can be interleaved with each other, one routine operating on the odd frames, the other on the even frames.

Figure 4:
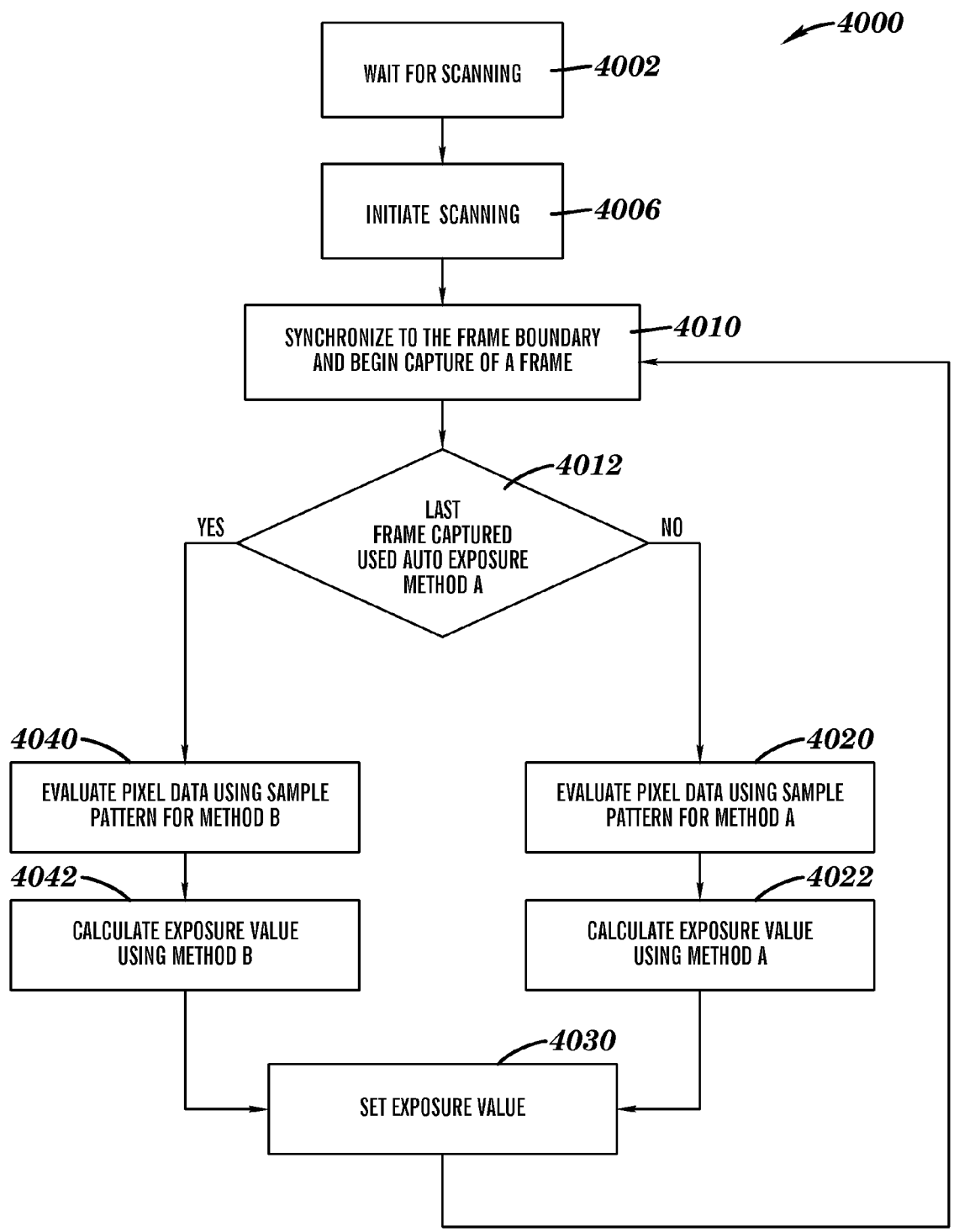
FIG. 4 is a flowchart illustrating one embodiment of a method for decoding a decodable indicia using the indicia reading terminal of FIG. 1.

FIG. 4 illustrates a flowchart of an embodiment of a process 4000 for decoding decodable indicia in accordance with an aspect of the present invention. At block 4002, terminal 1000 (FIGS. 1 and 2) may wait for scanning to be initiated and at block 4006, scanning may be initiated, e.g., by activation of a trigger signal via actuation of trigger 1220 (FIG. 1). A trigger signal can also be activated, e.g., via object detection, or a serial command from an external computer. Activation may include the powering of the imaging device and/or the enabling of the imager to begin recording image data by allowing the light sensitive pixels accumulate charge.

At block 4010, the system synchronizes to a frame boundary of an imager, and initiates the capture of a frame of image data. This synchronization is accomplished by monitoring the VSYNC frame synchronization pulse of an imager. When the VSYNC goes into an inactive state, this indicates that the output of frame X has completed and the output of frame X+1 is about to begin. When this pulse goes inactive, system configuration needs to be performed to prepare for the output of image data into memory. Often times this configuration includes setup of a DMA (direct memory access) 1070 (FIG. 2.) and/or other system components for routing the image frame data into RAM 1080. This needs to be completed before for the VSYNC goes active again, or else image frame data could be missed.

Once synchronization with the imager, and capture initiation have been done, at block 4012 a determination is made as to whether or not the last frame data captured was evaluated using a first auto-exposure method, referred to as Method A. If not, then while the frame data is being captured into memory, at step 4020 the system samples and evaluates the frame data using Method A. Once enough data from that frame has been evaluated to make a determination, a new exposure value is calculated at step 4022, and this new exposure value gets communicated to the imager by configuration of the imager exposure register(s) at step 4030. In order to run this system optimally, it is important that step 4030 finishes while the VSYNC is still active, because typical imager operation is such that the configuration of the exposure value register is latched into the operation of the imager as the exposure value of the next image at some point while VSYNC is inactive.

Coming back around to 4010, once again the system waits for VSYNC to go inactive indicating that the capture of the last frame has completed, and then initiates capture of another frame in the same way as was done before.

Once synchronization with the imager, and capture initiation have been done, at block 4012 a determination is made as to whether or not the last frame data captured was evaluated using a first auto-exposure method, referred to as Method A. If it has, then while the frame data is being captured into memory, at step 4040 the system samples and evaluates the frame data using Method B, which is different in some way from Method A. Once enough data from that frame has been evaluated to make a determination, a new exposure value is calculated at step 4042, and this new exposure value gets communicated to the imager by configuration of the imager exposure register(s) at step 4030. In order to run this system optimally, it is important that step 4030 finishes while the VSYNC is still active, because typical imager operation is such that the configuration of the exposure value register is latched into the operation of the imager as the exposure value of the next image at some point while VSYNC is inactive.

While the routine described above is explained using distinct and different sampling and/or auto-exposure methods A and B, it will be appreciated that other methods, configurations, or control parameters may be employed. For example, other methods, configurations, or control parameters may include different uses of gain, frame-rate, gamma correction, filtering, windowing the image or sampling the image at a lower resolution, and/or other methods which affect the nature of the pixels reported by the imager. Also, other configurations such as the use of an onboard illumination system 800 during the exposure of a frame, and/or turning off the illumination during the exposure of a frame as explained below is also part of the method being used in the present invention. In addition, other methods, configurations, or control parameters may also include different uses of illumination, an aiming pattern, focusing, aperture adjustment, and/or zooming.

In another aspect of the present invention, an indicia reading terminal may have a light source for emitting an illumination pattern on the decodable indicia. The illumination pattern may be configurable to be turned on and off. The indicia reading terminal may be used to obtain a series of odd images with the integrated light source on during the exposure of the pixel array and where the exposure value of a subsequent image with the light on is automatically adjusted based on a prior image with the light source on, and separately obtain a series of even images with the integrated light source off during the exposure of the pixel array and where the exposure value of a subsequent images with the light off is automatically adjusted based on a prior image with the light off.

For example, if the decodable image is a bar code on paper or electronic paper, the series of odd images, captured with the illumination on during the exposure window, may be better suited for reading and/or decoding the bar code compared to the series of even images. If the decodable image is a bar code displayed on a display having its own illumination, the series of even images, captured with the illumination off during the exposure window, may be better suited for reading and/or decoding the bar code compared to the series of odd images. By performing both illuminated and unilluminated exposures, and interleaving and alternating between the two auto exposure routines, terminal 1000 may improve or optimize its performance in reading both the screen-based indicia and paper-based indicia, where the decoding of indicia in both situations is desired, where either illuminated or unilluminated exposures might offer the best conditions for imaging and decoding the indicia.

In addition, various screen technologies have a wide variety of optical properties and may differ widely in reflectivity or other attributes that optically interfere with successfully imaging a screen under various forms of illumination, depending on factors such as the underlying technology, the number and types of layers involved in or over the screen, whether the screen is color or black and white, or whether the screen is enabled for touch input, for example. Many types of screens may cause substantial specular reflection of an external illumination source, for example. By having an illumination subsystem refraining from projecting illumination in an exposure period during which an imaging subsystem exposes a frame of image data, the imaging subsystem may image the target indicia without optical interference effects from the screen such as specular reflection, which may enable terminal 1000 to better image and decode the indicia.

For example, a frame may be captured using a first method such as utilizing illumination (e.g., with illumination subsystem emitting light) and using a first control parameter such as a first control exposure parameter or first exposure value. In the initial capturing, illumination may be provided and the first control parameter may be a preset or predetermined first control parameter when using illumination, or the last calculated first control parameter determined using illumination that was stored in the last triggered scanning.

Illuminated exposure periods and unilluminated exposure periods may be activated in any order in a reading cycle. For example, the first exposure in a cycle may be an illuminated exposure and the second exposure in the cycle may be an unilluminated exposure, or the first exposure in a cycle may be an unilluminated exposure and the second exposure in the cycle may be an illuminated exposure, in various illustrative embodiments.

Figure 5:
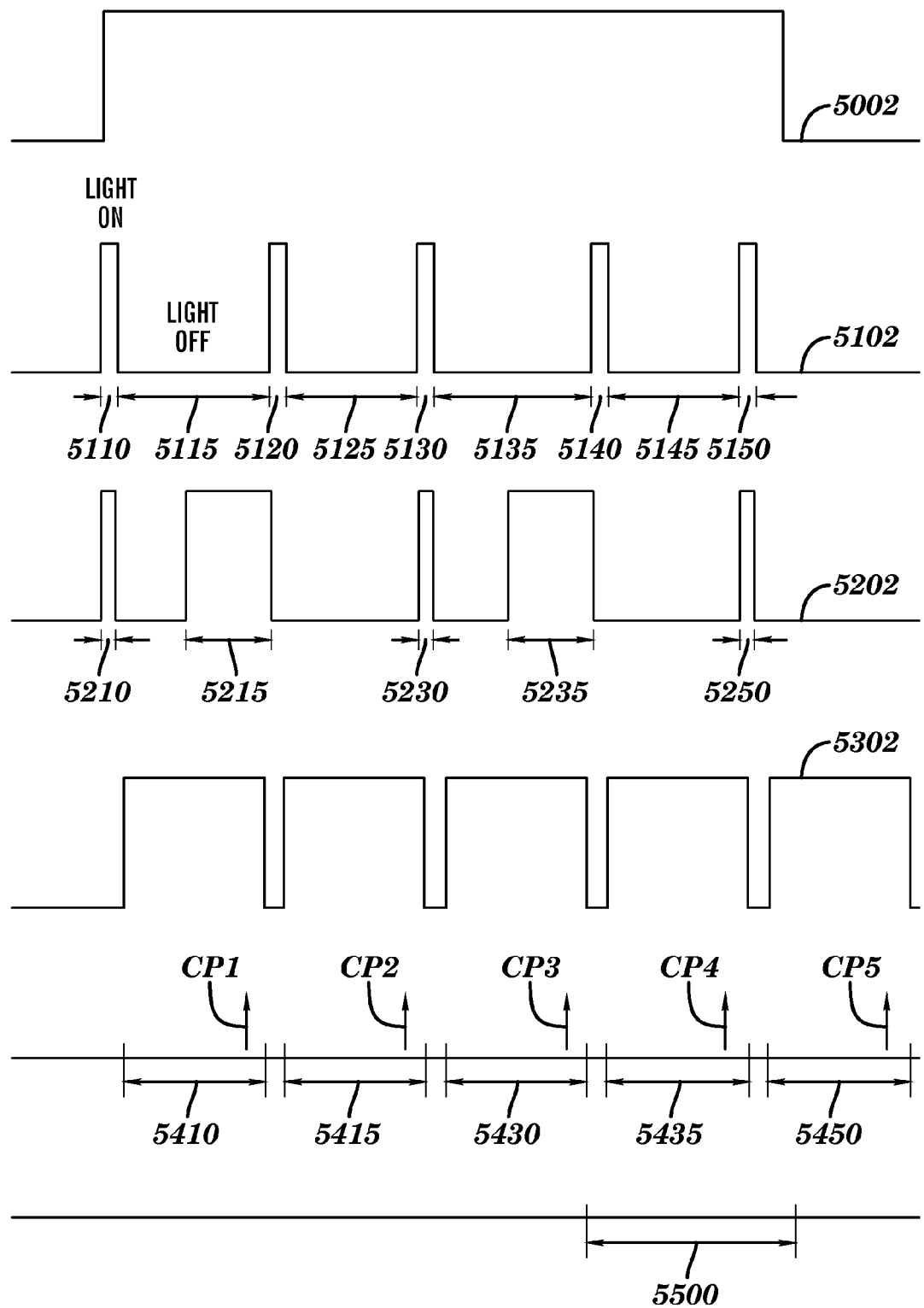
FIG. 5 is a timing diagram illustrating one embodiment for decoding a decodable indicia performed by the indicia reading terminal of FIG. 1.

FIG. 5 illustrates a timing diagram in connection with operation of the terminal 1000 during performance of the method indicated by the flowchart as shown in FIG. 4. Referring to the timing diagram of FIG. 5, a signal 5002 is a trigger signal which can be made active by actuation of trigger 1220 (FIG. 1), and which can be deactivated by releasing of trigger 1220 (FIG. 1). A trigger signal may also become inactive after a time out period or after a successful decode of a decodable indicia.

Signal 5102 is an input signal to illumination subsystem 800 (FIG. 2) having varying energization levels, e.g., illustrating an illumination pattern where illumination or light is being alternatively turned on and off. Periods, 5110, 5120, 5130, 5140 and 5150 illustrate where illumination is on, and periods 5115, 5125, 5135, and 5145 illustrate where illumination is off.

Signal 5202 is an exposure signal where active states define periods of exposing the image sensor array 1033 (FIG. 2) to light and inactive states intermediate the exposure periods for an image sensor of a terminal. For example, in an active state, an image sensor array of terminal 1000 (FIG. 2) is being exposed to light incident therein. An exposure control signal 5202 is an output signal of the imager that is the result of the exposure configuration for a given frame. The active high state of this signal represents the duration of time that the image sensor array is exposed to light for a given frame of data. As shown in FIG. 5, for example, during exposure periods 5210, 5230, and 5250, the image sensor array of terminal 1000 is exposed to light incident therein while the illumination subsystem is active. During exposure periods 5215 and 5235, the image sensor array of terminal 1000 is exposed to light incident therein while the illumination subsystem is inactive, e.g., the illumination subsystem is off.

It should be noted that illumination periods 5120 and 5140 do not line up with any active part of the exposure signal 5202. This is done to maintain a high frequency duty cycle of the illumination pattern that avoids flicker while still producing images exposed with and without illumination coming from the illumination subsystem.

Signal 5302 is the VSYNC (vertical synchronization) signal otherwise known as the Frame Valid signal. The VSYNC control signal is low during the transition between frames. During this time, the exposure setting written to the imager's exposure register(s) is latched in for usage on the next frame, the exposure window of a given frame closes, as illustrated by the negative going edge of signal 5202, and also when charge acquired to the sensor array 1033 (FIG. 2) is put into secondary storage in preparation of transferring the data out of the device. The VSYNC control signal is active high when image data from the image sensor array is being transferred out of the imager's secondary storage into system memory 1085 (FIG. 2), and in most systems to RAM memory 1080 (FIG. 2.) using a DMA 1070 (FIG. 2.) or other system memory routing device.

In the timing diagram of FIG. 5, periods 5410, 5415, 5430, 5435 and 5450 are periods at which processer 1060 may process frames of the pixel data, e.g., to determine the quality of the image data. For example, periods 5410, 5430, and 5450 correspond to determination of the quality of the pixel data resulting from exposure periods when the sensor array 1033 (FIG. 2) was accumulating charge while illumination subsystem 800 (FIG. 2) was illuminating the field of view of the imager, and periods 5415 and 5435 correspond to determination of the quality of the pixel data resulting from exposure periods when the sensor array 1033 (FIG. 2) was accumulating charge while illumination subsystem 800 was not illuminating the field of view of the imager.

In addition, during the determination of the quality of the pixel data, just at the end of the processing of the pixel data, or at the end of the processing of the pixel data, a new image control parameter may be calculated which will be used in subsequent control of the image sensor array. For example, during period 5410 which is evaluating an image exposed with illumination subsystem 800 (FIG. 2) illuminating the decodable indicia, a control parameter CP1 is determined. During period 5415 which is evaluating an image exposed with illumination subsystem 800 (FIG. 2) not illuminating the decodable indicia, a control parameter CP2 is determined. In one aspect of the present invention, control parameter CP1 may be used to control the exposure control signal during period 5230, e.g., the next exposure of the array with illumination subsystem 800 (FIG. 2) illuminating the decodable indicia, and control parameter CP2 may be used to control the exposure control signal during period 5235, e.g., the next exposure of the array without illumination subsystem 800 (FIG. 2) illuminating the decodable indicia. It will be appreciated that the control parameters may control other parameters used in obtaining the various images.

Figure 6:
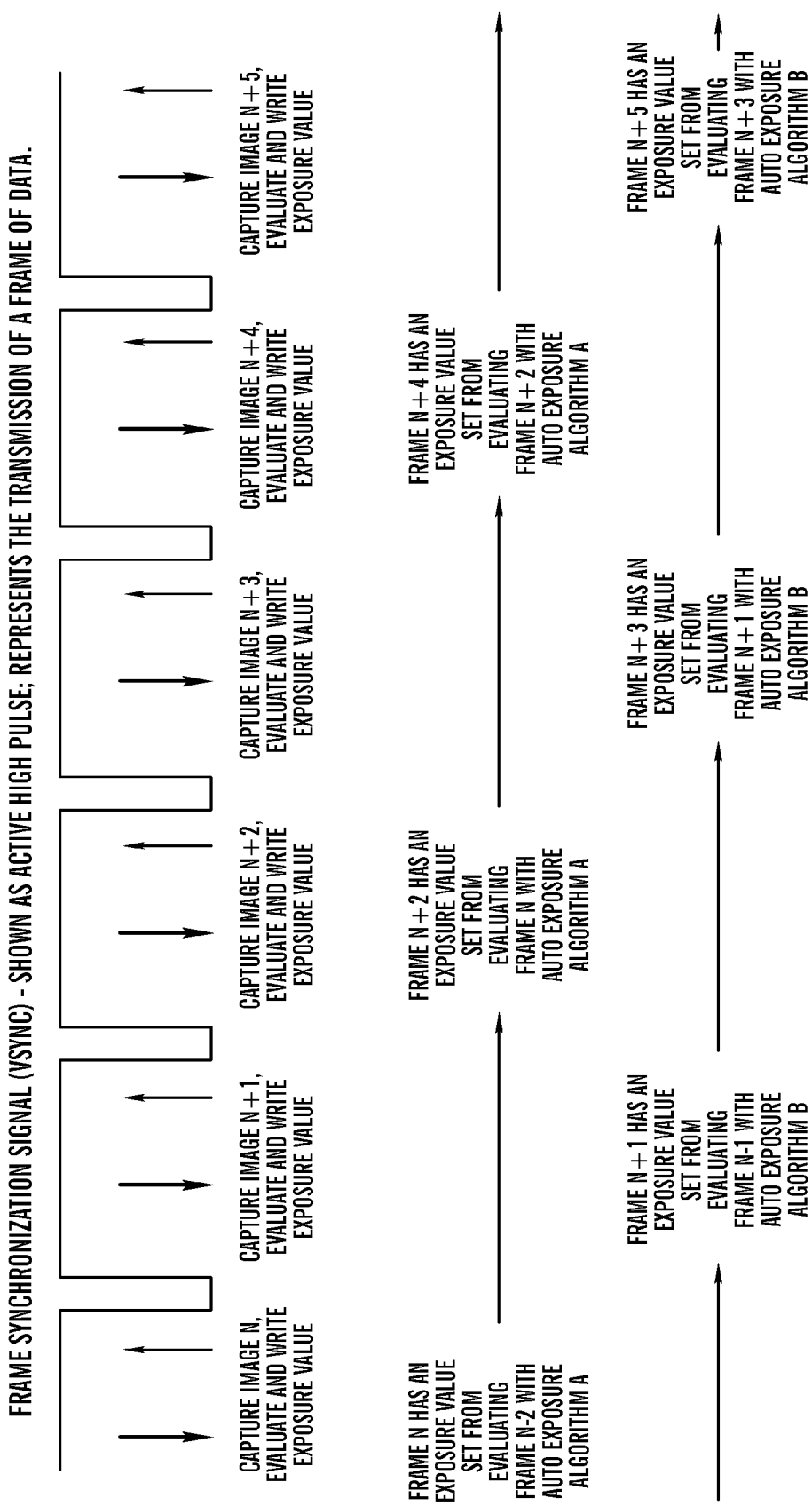
FIG. 6 is diagrammatic illustration of a series of frames corresponding to the flowchart of FIG. 4 and the timing diagram of FIG. 5.

FIG. 6 is diagrammatic illustration of a series of frames corresponding to the method of FIG. 4, and to the timing diagram of FIG. 5, showing the capture of the image, determining the new control parameter, and the use of new parameter in subsequent capture of an image. In FIG. 6, two separate and/or decoupled tracks are illustrated, for example, one track corresponding to where the decodable image is illuminated and the other track were the decodable image is not illuminated. For example, the indicia reading terminal may provide illumination periods of about 500 microseconds, and periods of unillumination of about 5 to about 15 milliseconds. It will be appreciated that the indicia reading terminal may employ two separate autoexposure algorithms, one of which is optimized for reading bar codes on paper and would run with frames which have the illumination on, and the other which is optimized for reading bar codes off screen such as a cell phone display would run with the frames that have the illumination off. The indicia reading terminal in this example includes a two frame pipeline. When an exposure is set as a result of information gleaned from frame X, it takes effect in frame X+1, but the result is only seen in image X+2. Same is said for exposure being set as a result of information gleaned from frame X+1, it takes effect in frame X+2, but the result is only seen in image X+3. A full-frame shutter imager can handle significant jumps in exposure from frame to frame, so the two exposure routines can run interleaved with, but completely decoupled from, each other.

From the present description, it will be appreciated that a separate and decoupled third, fourth, or more tracks may be implemented in accordance with the preset invention. For example, a third track may employ illumination subsystem at a reduced energization value. It will further be appreciated that the indicia reading terminal of the present invention may also determine or calculate more than one control parameter, which determined or calculated control parameters are used in a subsequent capture of an image.

It should also be appreciated that the image control parameter may be internal operating parameters of the imager, for example, an exposure period value, a gain control value, a frame rate value, a gamma value, filtering coefficients or other suitable control parameters. However, it may also be used for external control parameters used for imaging such as illumination control, focus adjustment, aperture adjustment, or other functions which can influence how image data is captured and/or analyzed.

The image control parameter may be, for example, determined based on an algorithm. The process of receiving or capturing a frame of image data (i.e., 1D or 2D symbology, text, image, or other indicia) that meets the threshold criteria of signal contrast, brightness, focus or other image characteristics utilized by the imager control algorithm will hereinafter be referred to as obtaining an acceptable image. Thus, an acceptable image is one that falls within a configured tolerance of the target image requirements set forth by the algorithm. There are many factors that can affect how acceptable images are obtained. For example, the level of ambient lighting in the imaging environment, the distance of the object from the imager, the contrast characteristics of the object, and others can affect the quality of the acquired image. The quality of the imager control algorithm in an image reader can be gauged by its ability to utilize multiple configuration settings and adapt itself to a variety of imaging situations while acquiring acceptable images. Thus, the quality of the imager control algorithm can be further measured by how quickly the algorithm is able to configure the imager to take acceptable images in any given scanning environment.

For example, the algorithm may monitor or evaluate the brightness of the pixels such as the top 5 percent of the pixels. If the pixels are determined to be too bright, the length of time of exposure control parameter may be lowered in obtaining a subsequent image. If the pixels are determined to be too dark, the length of time of exposure control parameter may be increased in obtaining a subsequent image.

As noted above, the control parameter of one track may include a first algorithm and the control parameter of the second track may include a second algorithm. The first and second control parameter may be different and/or the first and second control parameters may be the same but have different values. Further algorithms for use in the present invention include the algorithms described in U.S. Pat. No. 7,874,485 issued to Meier et al. entitled "Adaptive Optical Image Reader", and U.S. Pat. No. 7,148,923 issued to Harper et al. entitled "Methods and Apparatus for Automatic Exposure Control, the entire contents of these patents being incorporated herein by reference.

In one embodiment, terminal 1000 (FIG. 1) may be adapted to avoid subjecting a frame of image data to a decode attempt unless the frame is determined to be of suitable quality for a decode attempt. Referring again to the timing diagram of FIG. 5, in which a specific example is illustrated, CPU 1060 (FIG. 2) may not commence decoding processing, in accordance with a decode processing thread at decode attempt processing period 5500 with respect to a particular frame, until evaluation of a particular frame is determined to be of suitable quality for a decode attempt as a result of processing occurring during processing such as period 5410, 5415, 5430, etc. While terminal 1000 (FIG. 1) may be operative to subject each frame of a succession of frames to image quality evaluation processing and select a subset of the succession of frames to decoding processing, it will be appreciated that not every frame need be evaluated. For example, when one of the tracks (e.g., with illumination) of images provides a higher quality evaluation than the other track (e.g., without illumination), only one track may be subsequently evaluated. The evaluation of the image quality may be compared to predetermined criteria and/or to a prior image quality for the track of images. A quality score above a threshold predetermined criteria or above a prior image quality may result in the frame images being processed for decoding by processor 1060 (FIG. 2). Various filters may be employed for processing the quality of the image frames. Filtering may employ an IQ filter. Other processing filters incorporable in the preset invention may include U.S. Patent Application Publication No. 2010/0108769 and U.S. Patent Application Publication No. 2010/0108769 both by Wang et al., the entire subject matter of these applications being incorporated herein by reference. A successful decoding of the indicia based on one or more selected image frames may terminate the scanning by terminal 1000.

With reference again to FIG. 2, indicia reading terminal 1000 may include an image sensor 1032 comprising a multiple pixel image sensor array 1033 having pixels arranged in rows and columns of pixels, associated column circuitry 1034 and row circuitry 1035. Associated with the image sensor 1032 can be amplifier circuitry 1036 (amplifier), and an analog to digital converter 1037 which converts image information in the form of analog signals read out of image sensor array 1033 into image information in the form of digital signals. Image sensor 1032 can also have an associated timing and control circuit 1038 (incorporating the control parameter algorithms described above) for use in controlling e.g., the exposure period of image sensor 1032, gain applied to the amplifier 1036, etc. The noted circuit components 1032, 1036, 1037, and 1038 can be packaged into a common image sensor integrated circuit 1040. Image sensor integrated circuit 1040 can incorporate fewer than the noted number of components.

In one example, image sensor integrated circuit 1040 can be provided e.g., by an MT9V022 (752×480 pixel array) or an MT9V023 (752×480 pixel array) image sensor integrated circuit available from Micron Technology, Inc. In one example, image sensor array 1033 can be a hybrid monochrome and color image sensor array having a first subset of monochrome pixels without color filter elements and a second subset of color pixels having color sensitive filter elements. In one example, image sensor integrated circuit 1040 can incorporate a Bayer pattern filter, so that defined at the image sensor array 1033 are red pixels at red pixel positions, green pixels at green pixel positions, and blue pixels at blue pixel positions. Frames that are provided utilizing such an image sensor array incorporating a Bayer pattern can include red pixel values at red pixel positions, green pixel values at green pixel positions, and blue pixel values at blue pixel positions. In an embodiment incorporating a Bayer pattern image sensor array, processor 1060 prior to subjecting a frame to further processing can interpolate pixel values at frame pixel positions intermediate of green pixel positions utilizing green pixel values for development of a monochrome frame of image data. Alternatively, processor 1060 prior to subjecting a frame for further processing can interpolate pixel values intermediate of red pixel positions utilizing red pixel values for development of a monochrome frame of image data. Processor 1060 can alternatively, prior to subjecting a frame for further processing interpolate pixel values intermediate of blue pixel positions utilizing blue pixel values. An imaging subsystem of terminal 1000 can include image sensor 1032 and a lens assembly 200 for focusing an image onto image sensor array 1033 of image sensor 1032.

In the course of operation of terminal 1000, image signals can be read out of image sensor 1032, converted, and stored into a system memory such as RAM 1080. A memory 1085 of terminal 1000 can include RAM 1080, a nonvolatile memory such as EPROM 1082 and a storage memory device 1084 such as may be provided by a flash memory or a hard drive memory. In one embodiment, terminal 1000 can include processor 1060 which can be adapted to read out image data stored in memory 1080 and subject such image data to various image processing algorithms. Terminal 1000 can include a direct memory access unit (DMA) 1070 for routing image information read out from image sensor 1032 that has been subject to conversion to RAM 1080. In another embodiment, terminal 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

With reference still to FIG. 2 and referring to further aspects of terminal 1000, imaging lens assembly 200 can be adapted for focusing an image of decodable indicia 15 located within a field of view 1240 on a substrate or on a screen onto image sensor array 1033. A size in target space of a field of view 1240 of terminal 1000 can be varied in a number of alternative ways. A size in target space of a field of view 1240 can be varied, e.g., by changing a terminal to target distance, changing an imaging lens assembly setting, changing a number of pixels of image sensor array 1033 that are subject to read out. Imaging light rays can be transmitted about imaging axis 25. Lens assembly 200 can be adapted to be capable of multiple focal lengths and multiple planes of optimum focus (best focus distances).

Terminal 1000 may include an illumination subsystem 800 for illumination of target, and projection of illumination pattern 1260. Illumination pattern 1260, in the embodiment shown can be projected to be proximate to but larger than an area defined by field of view 1240, but can also be projected in an area smaller than an area defined by field of view 1240. Illumination subsystem 800 can include a light source bank 500, comprising one or more light sources. Light source assembly 800 may further include one or more light source banks, each comprising one or more light sources, for example. Such light sources can illustratively include light emitting diodes (LEDs), in an illustrative embodiment. LEDs with any of a wide variety of wavelengths and filters or combination of wavelengths or filters may be used in various embodiments. Other types of light sources may also be used in other embodiments. The light sources may illustratively be mounted to a printed circuit board. This may be the same printed circuit board on which an image sensor integrated circuit 1040 having an image sensor array 1033 may illustratively be mounted.

Terminal 1000 can also include an aiming subsystem 600 for projecting an aiming pattern (not shown). Aiming subsystem 600 which can comprise a light source bank can be coupled to aiming light source bank power input unit 1208 for providing electrical power to a light source bank of aiming subsystem 600. Power input unit 1208 can be coupled to system bus 1500 via interface 1108 for communication with processor 1060.

In one embodiment, illumination subsystem 800 may include, in addition to light source bank 500, an illumination lens assembly 300, as is shown in the embodiment of FIG. 2. In addition to or in place of illumination lens assembly 300 illumination subsystem 800 can include alternative light shaping optics, e.g. one or more diffusers, mirrors and prisms. In use, terminal 1000 can be oriented by an operator with respect to a target, (e.g., a piece of paper, a package, a screen, or another type of substrate, etc.) bearing decodable indicia 15 in such manner that illumination pattern 1260 is projected on decodable indicia 15. In another use, terminal 1000 can be oriented by an operator with respect to a target (backlit screen, LCD monitor, cathode ray tube, etc.) bearing decodable indicia 115 (FIG. 1) in such a manner that the target substrate is self illuminating. In this case, an illumination pattern generated by illumination subsystem 800 is not needed. In the example of FIG. 2, decodable indicia 15 is provided by a 1D bar code symbol. Decodable indicia 15 could also be provided by a 2D bar code symbol or optical character recognition (OCR) characters. Referring to further aspects of terminal 1000, lens assembly 200 can be controlled with use of electrical power input unit 1202 which provides energy for changing a plane of optimum focus of lens assembly 200. In one embodiment, an electrical power input unit 1202 can operate as a controlled voltage source, and in another embodiment, as a controlled current source. Electrical power input unit 1202 can apply signals for changing optical characteristics of lens assembly 200, e.g., for changing a focal length and/or a best focus distance of (a plane of optimum focus of) lens assembly 200. Light source bank electrical power input unit 1206 can provide energy to light source bank 500. In one embodiment, electrical power input unit 1206 can operate as a controlled voltage source. In another embodiment, electrical power input unit 1206 can operate as a controlled current source. In another embodiment electrical power input unit 1206 can operate as a combined controlled voltage and controlled current source. Electrical power input unit 1206 can change a level of electrical power provided to (energization level of) light source bank 500, e.g., for changing a level of illumination output by light source bank 500 of illumination subsystem 800 for generating illumination pattern 1260.

In another aspect, terminal 1000 can include power supply 1402 that supplies power to a power grid 1404 to which electrical components of terminal 1000 can be connected. Power supply 1402 can be coupled to various power sources, e.g., a battery 1406, a serial interface 1408 (e.g., USB, RS232), and/or AC/DC transformer 1410).

Further regarding power input unit 1206, power input unit 1206 can include a charging capacitor that is continually charged by power supply 1402. Power input unit 1206 can be configured to output energy within a range of energization levels. An average energization level of illumination subsystem 800 during exposure periods with the first illumination and exposure control configuration active can be higher than an average energization level of illumination and exposure control configuration active.

Terminal 1000 can also include a number of peripheral devices including trigger 1220 (FIG. 1) which may be used to make active a trigger signal for activating frame readout and/or certain decoding processes. Terminal 1000 can be adapted so that activation of trigger 1220 activates a trigger signal and initiates a decode attempt. Specifically, terminal 1000 can be operative so that in response to activation of a trigger signal, a succession of frames can be captured by way of read out of image information from image sensor array 1033 (typically in the form of analog signals) and then storage of the image information after conversion into memory 1080 (which can buffer one or more of the succession of frames at a given time). Processor 1060 can be operative to subject one or more of the succession of frames to a decode attempt.

For attempting to decode a bar code symbol, e.g., a one dimensional bar code symbol, processor 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup.

Terminal 1000 can include various interface circuits for coupling various of the peripheral devices to system address/data bus (system bus) 1500, for communication with processor 1060 also coupled to system bus 1500. Terminal 1000 can include interface circuit 1028 for coupling image sensor timing and control circuit 1038 to system bus 1500, interface circuit 1102 for coupling electrical power input unit 1202 to system bus 1500, interface circuit 1106 for coupling illumination light source bank power input unit 1206 to system bus 1500, and interface circuit 1120 for coupling trigger 1220 to system bus 1500. Terminal 1000 can also include a display 1222 coupled to system bus 1500 and in communication with processor 1060, via interface 1122, as well as pointer mechanism 1224 in communication with processor 1060 via interface 1124 connected to system bus 1500. Terminal 1000 can also include range detector unit 1210 coupled to system bus 1500 via interface 1110. In one embodiment, range detector unit 1210 can be an acoustic range detector unit. Various interface circuits of terminal 1000 can share circuit components. For example, a common microcontroller can be established for providing control inputs to both image sensor timing and control circuit 1038 and to power input unit 1206. A common microcontroller providing control inputs to circuit 1038 and to power input unit 1206 can be provided to coordinate timing between image sensor array controls and illumination subsystem controls.

A succession of frames of image data that can be captured and subject to the described processing can be full frames (including pixel values corresponding to each pixel of image sensor array 1033 or a maximum number of pixels read out from image sensor array 1033 during operation of terminal 1000). A succession of frames of image data that can be captured and subject to the described processing can also be "windowed frames" comprising pixel values corresponding to less than a full frame of pixels of image sensor array 1033. A succession of frames of image data that can be captured and subject to the above described processing can also comprise a combination of full frames and windowed frames. A full frame can be read out for capture by selectively addressing pixels of image sensor 1032 having image sensor array 1033 corresponding to the full frame. A windowed frame can be read out for capture by selectively addressing pixels of image sensor 1032 having image sensor array 1033 corresponding to the windowed frame. In one embodiment, a number of pixels subject to addressing and read out determine a picture size of a frame. Accordingly, a full frame can be regarded as having a first relatively larger picture size and a windowed frame can be regarded as having a relatively smaller picture size relative to a picture size of a full frame. A picture size of a windowed frame can vary depending on the number of pixels subject to addressing and readout for capture of a windowed frame.

Terminal 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame. A frame rate of terminal 1000 can be increased (and frame time decreased) by decreasing of a frame picture size.

Further aspects of terminal 1000 in one embodiment are described with reference again to FIG. 1. Trigger 1220, display 1222, pointer mechanism 1224, and keyboard 1226 can be disposed on a common side of a hand held housing 1014 as shown in FIG. 1. Display 1222 and pointer mechanism 1224 in combination can be regarded as a user interface of terminal 1000. Display 1222 in one embodiment can incorporate a touch panel for navigation and virtual actuator selection in which case a user interface of terminal 1000 can be provided by display 1222. A user interface of terminal 1000 can also be provided by configuring terminal 1000 to be operative to be reprogrammed by decoding of programming bar code symbols. A hand held housing 1014 for terminal 1000 can in another embodiment be devoid of a display and can be in a gun style form factor. Imaging module 1040 including image sensor array 1033 and imaging lens assembly 200 can be incorporated in hand held housing 1014.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

The invention claimed is:

1. A device for obtaining images, said device comprising:
an imaging subsystem comprising an image sensor array and an imaging assembly operative for focusing an image onto said image sensor array;
a housing incorporating said imaging subsystem;
wherein said device is configured to acquire a first plurality of images based on a first control parameter in which said first control parameter for a subsequent image of said first plurality of images is adjusted based on a prior image of said first plurality of images, configured to acquire a second plurality of images based on a second control parameter different from said first control parameter in which said second control parameter for a subsequent image of said second plurality of images is adjusted based on a prior image of said second plurality of images, and configured to acquire said first adjusted plurality of images interspersed with said second differently adjusted plurality of images.

2. The device of claim 1 further comprising said device being operable to attempt to decode a decodable indicia utilizing one or more images of said first and second plurality of images.

3. The device of claim 1 further comprising an illumination subsystem operative for projecting an illumination pattern operable for use in acquiring said first plurality of images and said second plurality of images.

4. The device of claim 1 wherein said first plurality of images and said second plurality of images being evenly interspersed so that said first control parameter obtained at image N is utilized in image N+2, and so that said second control parameter obtained at image N+1 is utilized in image N+3.

5. The device of claim 1 wherein said first control parameter and said second control parameter comprises the same control parameter having different values.

6. The device of claim 1 wherein said first control parameter comprises a first exposure control parameter, and said second control parameter comprises a second exposure control parameter.

7. The device of claim 1 wherein said device is operable to determine quality evaluation based on quality of pixel data of at least one of said images of said first plurality of images and said second plurality of images.

8. The device of claim 7 further comprising said device being operable to attempt to decode a decodable indicia from selected images based on said quality evaluation.

9. The device of claim 1 wherein said device is operable to attempt to decode the decodable indicia comprising a bar code.

10. The device of claim 1 wherein said device is operable to attempt to decode a decodable indicia comprising at least one of a bar code disposed on a substrate, and a bar code disposed on a backlit display.

11. The device of claim 1 wherein said device comprises a hand held indicia reading terminal.

12. An indicia reading terminal comprising:
an illumination subsystem operative for projecting an illumination pattern;
an imaging subsystem comprising an image sensor array and an imaging assembly operative for focusing an image onto said image sensor array;
a housing incorporating said illumination subsystem and said imaging subsystem;

wherein said indicia reading terminal is configured to acquire a first plurality of images exposed during illuminated portions of said illumination pattern based on a first control parameter in which said first control parameter for a subsequent image of said first plurality of images is adjusted based on a prior image of said first plurality of images, configured to acquire a second plurality of images exposed during unilluminated portions of said illumination pattern based on a second control parameter different from said first control parameter in which said second control parameter for a subsequent image of said second plurality of images is adjusted based on a prior image of said second plurality of images, and configured to obtain said first adjusted plurality of images interspersed with said second differently adjusted plurality of images; and wherein said indicia reading terminal is operable to attempt to decode a decodable indicia comprising a bar code disposed on a substrate using at least one of said first plurality of images, and operable to attempt to decode a decodable indicia comprising a bar code disposed on a backlit display using at least one of said second plurality of images.

13. The indicia reading terminal of claim 12 wherein said first plurality of images and said second plurality of images being evenly interspersed so that a first control parameter obtained at image N is utilized in image N+2, and so that a second control parameter obtained at image N+1 is utilized in image N+3.

14. The indicia reading terminal of claim 12 wherein said first image control parameter and said second image control parameter comprises the same image control parameter having different values.

15. The indicia reading terminal of claim 12 wherein said first control parameter comprises a first exposure control parameter, and said second control parameter comprises a second exposure control parameter.

16. The indicia reading terminal of claim 12 wherein said indicia reading terminal is operable to determine quality evaluation of at least one of said images of said first plurality of images and said second plurality of images, and wherein said indicia reading terminal being operable to attempt to decode the decodable indicia comprises said indicia reading terminal being operable to attempt to decode a decodable indicia from selected images based on said quality evaluation.

17. The indicia reading terminal of claim 12 wherein said indicia reading terminal comprises a hand held indicia reading terminal.

18. A method for use in obtaining images, the method comprising:
automatically adjusting a first control parameter in a device for capturing a first plurality of images;
automatically adjusting a second control parameter different from the first control parameter in the device for capturing a second plurality of images; and
automatically obtaining the first adjusted plurality of images interspersed with the second differently adjusted plurality of images.

19. The method of claim 18 further comprising attempting to decode the decodable indicia utilizing one or more images of the first and second plurality of images.

20. The method of claim 18 further comprising providing an illumination pattern operable for use in acquiring said first plurality of images and said second plurality of images.

21. The method of claim 18 wherein the first plurality of images and the second plurality of images being evenly interspersed so that a first control parameter obtained at image N is utilized in image N+2, and so that a second control parameter obtained at image N+1 is utilized in image N+3.

22. The method of claim 18 wherein the first control parameter and the second control parameter comprises the same control parameter having different values.

23. The method of claim 18 wherein said first control parameter comprises a first exposure control parameter, and said second control parameter comprises a second exposure control parameter.

24. The method of claim 18 wherein the first plurality of images is configured to decoding decodable indicia disposed on a substrate, and the second plurality of images is adapted to decoding decodable indicia disposed on a backlit display.

25. The method of claim 18 further comprising determining a quality evaluation of at least one of the images of the first plurality of images and the second plurality of images, and further comprising attempting to decode decodable indicia utilizing one or more images selected from images based on the quality evaluation.

26. The method of claim 18 wherein the decodable indicia comprising a bar code.

27. A method for decoding decodable indicia, the method comprising:
projecting an illumination pattern from an indicia reading terminal onto a decodable indicia;
automatically adjusting a first control parameter in the indicia reading terminal for capturing a first plurality of images exposed during illuminated portions of the illumination pattern;
automatically adjusting a second control parameter different from the first control parameter in the indicia reading terminal for capturing a second plurality of images exposed during unilluminated portions of the illumination pattern;
automatically obtaining the first adjusted plurality of images interspersed with the second differently adjusted plurality of images; and
attempting to decode the decodable indicia utilizing one or more images of the first and second plurality of images.

28. The method of claim 27 wherein the first plurality of images and the second plurality of images being evenly interspersed so that a first control parameter obtained at image N is utilized in image N+2, and so that a second control parameter obtained at image N+1 is utilized in image N+3.

29. The method of claim 27 further comprising optimizing the control parameter for images exposed during the illuminated portions of the illumination pattern for decoding the decodable indicia disposed on a substrate, and optimizing the control parameter for the images exposed during unilluminated portions of the illumination pattern for decoding the decodable indicia disposed on a backlit display.

30. The method of claim 27 wherein the first image control parameter and the second image control parameter comprises the same image control parameter having different values.

31. The method of claim 27 wherein said first control parameter comprises a first exposure control parameter, and said second control parameter comprises a second exposure control parameter.

32. The method of claim 27 further comprising determining a quality evaluation of at least one of the images of the first plurality of images and the second plurality of images, and wherein the attempting to decode comprises attempting to decode decodable indicia utilizing one or more images selected from images based on the quality evaluation.

* * * * *